United States Patent
Kuwahara

(10) Patent No.: US 6,814,888 B2
(45) Date of Patent: Nov. 9, 2004

(54) DOPANT AGENT AND ELECTROCONDUCTIVE POLYMER MATERIAL COMPRISING THE SAME

(75) Inventor: Masahiro Kuwahara, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/312,960
(22) PCT Filed: May 13, 2002
(86) PCT No.: PCT/JP02/04603
§ 371 (c)(1), (2), (4) Date: Dec. 31, 2002
(87) PCT Pub. No.: WO02/092695
PCT Pub. Date: Nov. 21, 2002

(65) Prior Publication Data
US 2003/0142462 A1 Jul. 31, 2003

(30) Foreign Application Priority Data
May 11, 2001 (JP) .......... 2001-141114
May 17, 2001 (JP) .......... 2001-147410

(51) Int. Cl.⁷ .......... H01B 1/12
(52) U.S. Cl. .......... 252/500
(58) Field of Search .......... 252/500; 549/393; 544/285

(56) References Cited

U.S. PATENT DOCUMENTS

| | | | |
|---|---|---|---|
| 4,207,107 A | 6/1980 | Ross | |
| 4,267,325 A | 5/1981 | Black | |
| 6,015,458 A | * 1/2000 | Schulz et al. | .......... 106/498 |

FOREIGN PATENT DOCUMENTS

| | | | |
|---|---|---|---|
| DE | 2846432 | * | 5/1980 |
| EP | 647629 | * | 5/1995 |
| JP | 04-121754 A | | 4/1992 |
| JP | 04-290833 A | | 10/1992 |
| JP | 06-059518 A | | 3/1994 |
| JP | 07-114216 A | | 5/1995 |
| JP | 2000-204074 A | | 7/2000 |

* cited by examiner

Primary Examiner—Mark Kopec
(74) Attorney, Agent, or Firm—Burns, Doane, Swecker & Mathis, L.L.P.

(57) ABSTRACT

A conductive polymer material can exhibit good heat resistance and good moisture resistance, in which the conductive polymer comprises as a dopant at least one of aromatic sulfonic acid derivatives represented by general formula 1:

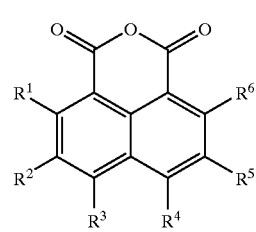

[1]

wherein at least one of $R^1$ to $R^6$ represents a sulfonic acid group having a counter cation selected from the group consisting of a hydrogen ion, an alkali metal ion, an alkaline-earth ion and a transition metal ion belonging to groups 8 to 10 in the periodic table; and the remaining $R^1$ to $R^6$, which may be the same or different, represent hydrogen, alkyl having four or less carbon atoms or phenyl; or any two or more of $R^1$ to $R^6$ may be combined together to form an aromatic or aliphatic ring; and general formula 2:

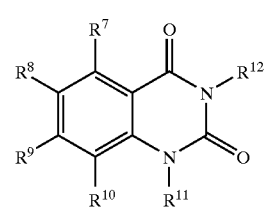

[2]

wherein at-least one of $R^7$ to $R^{10}$ represents a sulfonic acid group having a counter cation selected from the group consisting of a hydrogen ion, an alkali metal ion, an alkaline-earth ion and a transition metal ion belonging to groups 8 to 10 in the periodic table; and the remaining $R^7$ to $R^{12}$, which may be the same or different, represent hydrogen, alkyl having four or less carbon atoms or phenyl; or any two or more of $R^7$ to $R^{10}$ may be combined together to form an aromatic or aliphatic ring.

4 Claims, No Drawings

DOPANT AGENT AND ELECTROCONDUCTIVE POLYMER MATERIAL COMPRISING THE SAME

FIELD OF THE INVENTION

This invention relates to a novel aromatic sulfonic acid derivative dopant which is applicable to a conductive polymer material; a conductive polymer material containing the dopant; and a solid electrolytic capacitor using the polymer material. In particular, this invention relates to a conductive polymer material with good heat resistance and moisture resistance which is suitable for manufacturing a solid electrolytic capacitor, and a solid electrolytic capacitor in which the polymer material is used as a cathode conductive material.

BACKGROUND OF THE INVENTION

In recent years with the advance in electronics technology, novel electronic materials have been developed. In particular, remarkable technological innovation has been achieved in the area involving high performance organic materials. Even if the scope of view is restricted to the conductive materials alone, there have been developed conductive polymer materials produced by way of doping electron-conjugated polymers such as polyacetylene, polyparaphenylene, polypyrrole, and polyaniline with some electron acceptable compounds as the dopant. And, there are even cases in which newly developed materials have been actually industrialized as a capacitor electrode material, a battery electrode material and an antistatic material.

However, for extending industrial applicability of these conductive polymer materials, significant problems involving environmental stability such as heat resistance and moisture resistance must be solved, besides further improvement in conductivity.

For solving these problems encountered in industrialization, we have provided, in terms of environmental stability, a π-electron conjugated polymer material comprising an m-sulfobenzamide derivative as a dopant, exhibiting both higher conductivity and improved heat resistance in Japanese Laid-open Patent Publication 2000-204074.

For example, we have found that polypyrrole doped with m-sulfobenzamide exhibits considerably slow reduction in a conductivity even when being placed in the air at 150° C. and can maintain a high conductivity of 100 S/cm or more.

Polypyrrole doped with m-sulfobenzamide, however, rapidly loses its conductivity when the atmosphere contains moisture at a high temperature. Thus, for extending industrial applicability of a conductive polymer material, it is essential that the material exhibits improved stability under the moisture-containing atmosphere at a high temperature, i.e., under the conditions of a high temperature and a high humidity.

Thus, an objective of this invention is to provide a dopant which endows a π-electron conjugated polymer material with a higher conductivity which can be retained even under the environmental conditions of a high temperature and a high humidity; a conductive polymer material with good heat resistance and good moisture resistance; and a solid electrolytic capacitor comprising the polymer material.

SUMMARY OF THE INVENTION

Namely, this invention relates to a dopant comprising at least one of aromatic sulfonic acid derivatives represented by general formulas 1 and 2; a conductive polymer material containing the dopant which exhibits good heat resistance and good moisture resistance; and a solid electrolytic capacitor comprising the polymer material.

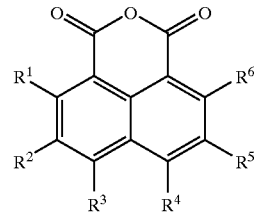

[1]

wherein at least one of $R^1$ to $R^6$ represents a sulfonic acid group having a counter cation selected from the group consisting of a hydrogen ion, an alkali metal ion, an alkaline-earth ion and a transition metal ion belonging to groups 8 to 10 in the periodic table; and the remaining $R^1$ to $R^6$, which may be the same or different, represent hydrogen, alkyl having four or less carbon atoms or phenyl; or any two or more of $R^1$ to $R^6$ may be combined together to form an aromatic or aliphatic ring.

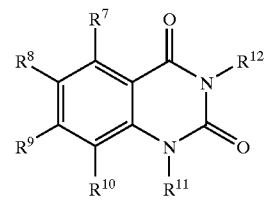

[2]

wherein at least one of $R^7$ to $R^{10}$ represents a sulfonic acid group having a counter cation selected from the group consisting of a hydrogen ion, an alkali metal ion, an alkaline-earth ion and a transition metal ion belonging to groups 8 to 10 in the periodic table; and the remaining $R^7$ to $R^{12}$, which may be the same or different, represent hydrogen, alkyl having four or less carbon atoms or phenyl; or any two or more of $R^7$ to $R^{10}$ may be combined together to form an aromatic or aliphatic ring.

DETAILED DESCRIPTION OF PREFERRED EMBODIMENTS

In this invention, one or more aromatic sulfonic acid derivatives represented by general formula 1 and 2 above are used as a dopant.

In the aromatic sulfonic acid derivative represented by general formula 1 or 2, a counter cation to a sulfonic acid group is a cation of an element selected from hydrogen, alkali metals, alkaline earth metals and transition metals belonging to groups 8 to 10 in the periodic table; for example, hydrogen, lithium, sodium, potassium, rubidium, cesium, beryllium, magnesium, calcium, strontium, barium, iron, cobalt, nickel, ruthenium, rhodium, palladium, osmium, iridium and platinum ions, preferably hydrogen, sodium, potassium and iron(III) ions.

Examples of the aromatic sulfonic acid derivative represented by general formula 1 include aromatic sulfonic acid derivatives such as 2-sulfo-1,8-naphthalic anhydride,
3-sulfo-1,8-naphthalic anhydride,
4-sulfo-1,8-naphthalic anhydride, 3,5-disulfo-1,8-naphthalic anhydride,
3,6-disulfo-1,8-naphthalic anhydride,
4,5-disulfo-1,8-naphthalic anhydride,
2-methyl-4-sulfo-1,8-naphthalic anhydride,
5-methyl-4-sulfo-1,8-naphthalic anhydride,
6-methyl-4-sulfo-1,8-naphthalic anhydride,
7-methyl-4-sulfo-1,8-naphthalic anhydride,
5-methyl-3-sulfo-1,8-naphthalic anhydride,
6-methyl-3-sulfo-1,8-naphthalic anhydride,
7-methyl-3-sulfo-1,8-naphthalic anhydride,
2-ethyl-4-sulfo-1,8-naphthalic anhydride,
5-ethyl-4-sulfo-1,8-naphthalic anhydride,
6-ethyl-4-sulfo-1,8-naphthalic anhydride,
7-ethyl-4-sulfo-1,8-naphthalic anhydride,
5-ethyl-3-sulfo-1,8-naphthalic anhydride,
6-ethyl-3-sulfo-1,8-naphthalic anhydride,
7-ethyl-3-sulfo-1,8-naphthalic anhydride,
2-n-propyl-4-sulfo-1,8-naphthalic anhydride,
5-n-propyl-4-sulfo-1,8-naphthalic anhydride,
6-n-propyl-4-sulfo-1,8-naphthalic anhydride,
7-n-propyl-4-sulfo-1,8-naphthalic anhydride,
5-n-propyl-3-sulfo-1,8-naphthalic anhydride,
6-n-propyl-3-sulfo-1,8-naphthalic anhydride,
7-n-propyl-3-sulfo-1,8-naphthalic anhydride,
2-isopropyl-4-sulfo-1,8-naphthalic anhydride,
5-isopropyl-4-sulfo-1,8-naphthalic anhydride,
6-isopropyl-4-sulfo-1,8-naphthalic anhydride,
7-isopropyl-4-sulfo-1,8-naphthalic anhydride,
5-isopropyl-3-sulfo-1,8-naphthalic anhydride,
6-isopropyl-3-sulfo-1,8-naphthalic anhydride,
7-isopropyl-3-sulfo-1,8-naphthalic anhydride,
2-n-butyl-4-sulfo-1,8-naphthalic anhydride,
5-n-butyl-4-sulfo-1,8-naphthalic anhydride,
6-n-butyl-4-sulfo-1,8-naphthalic anhydride,
7-n-butyl-4-sulfo-1,8-naphthalic anhydride,
5-n-butyl-3-sulfo-1,8-naphthalic anhydride,
6-n-butyl-3-sulfo-1,8-naphthalic anhydride,
7-n-butyl-3-sulfo-1,8-naphthalic anhydride,
2-isobutyl-4-sulfo-1,8-naphthalic anhydride,
5-isobutyl-4-sulfo-1,8-naphthalic anhydride,
6-isobutyl-4-sulfo-1,8-naphthalic anhydride,
7-isobutyl-4-sulfo-1,8-naphthalic anhydride,
5-isobutyl-3-sulfo-1,8-naphthalic anhydride,
6-isobutyl-3-sulfo-1,8-naphthalic anhydride,
7-isobutyl-3-sulfo-1,8-naphthalic anhydride,
2-tert-butyl-4-sulfo-1,8-naphthalic anhydride,
5-tert-butyl-4-sulfo-1,8-naphthalic anhydride,
6-tert-butyl-4-sulfo-1,8-naphthalic anhydride,
7-tert-butyl-4-sulfo-1,8-naphthalic anhydride,
5-tert-butyl-3-sulfo-1,8-naphthalic anhydride,
6-tert-butyl-3-sulfo-1,8-naphthalic anhydride,
7-tert-butyl-3-sulfo-1,8-naphthalic anhydride,
2-phenyl-4-sulfo-1,8-naphthalic anhydride,
5-phenyl-4-sulfo-1,8-naphthalic anhydride,
6-phenyl-4-sulfo-1,8-naphthalic anhydride,
7-phenyl-4-sulfo-1,8-naphthalic anhydride,
5-phenyl-3-sulfo-1,8-naphthalic anhydride,
6-phenyl-3-sulfo-1,8-naphthalic anhydride,
7-phenyl-3-sulfo-1,8-naphthalic anhydride,
3-sulfo-1,9-anthracenedicarboxylic anhydride,
4-sulfo-1,9-anthracenedicarboxylic anhydride,
10-sulfo-1,9-anthracenedicarboxylic anhydride,
3-sulfo-1,10-phenanthrenedicarboxylic anhydride,
4-sulfo-1,10-phenanthrenedicarboxylic anhydride, and
3-sulfoacenaphthylene-5,6-dicarboxylic anhydride, as well as alkali metal salts, alkaline earth metal salts and transition metal salts belonging to groups 8 to 10 in the periodic table, preferably sodium salts, potassium salts and iron(III) salts, of the aromatic sulfonic acid derivatives.

Preferable examples include aromatic sulfonic acid derivatives such as
2-sulfo-1,8-naphthalic anhydride,
3-sulfo-1,8-naphthalic anhydride,
4-sulfo-1,8-naphthalic anhydride,
3,5-disulfo-1,8-naphthalic anhydride,
3,6-disulfo-1,8-naphthalic anhydride,
4,5-disulfo-1,8-naphthalic anhydride,
2-methyl-4-sulfo-1,8-naphthalic anhydride,
5-methyl-4-sulfo-1,8-naphthalic anhydride,
6-methyl-4-sulfo-1,8-naphthalic anhydride,
7-methyl-4-sulfo-1,8-naphthalic anhydride,
5-methyl-3-sulfo-1,8-naphthalic anhydride,
6-methyl-3-sulfo-1,8-naphthalic anhydride,
7-methyl-3-sulfo-1,8-naphthalic anhydride,
3-sulfo-1,9-anthracenedicarboxylic anhydride,
4-sulfo-1,9-anthracenedicarboxylic anhydride and
10-sulfo-1,9-anthracenedicarboxylic anhydride, as well as sodium, potassium and iron(III) salts of the aromatic sulfonic acid derivatives.

More preferable examples include 3-sulfo-1,8-naphthalic anhydride and 4-sulfo-1,8-naphthalic anhydride as well as sodium, potassium and iron(III) salts of the aromatic sulfonic acid derivatives.

Examples of the aromatic sulfonic acid derivative represented by general formula 2 include aromatic sulfonic acid derivatives such as
2,4-dioxo-1,2,3,4-tetrahydroquinazoline-5-sulfonic acid,
2,4-dioxo-1,2,3,4-tetrahydroquinazoline-6-sulfonic acid,
2,4-dioxo-1,2,3,4-tetrahydroquinazoline-7-sulfonic acid,
2,4-dioxo-1,2,3,4-tetrahydroquinazoline-8-sulfonic acid,
2,4-dioxo-1,2,3,4-tetrahydroquinazoline-5,7-disulfonic acid,
2,4-dioxo-1,2,3,4-tetrahydroquinazoline-6,8-disulfonic acid,
1-methyl-2,4-dioxo-1,2,3,4-tetrahydroquinazoline-5-sulfonic acid,
1-methyl-2,4-dioxo-1,2,3,4-tetrahydroquinazoline-6-sulfonic acid,
1-methyl-2,4-dioxo-1,2,3,4-tetrahydroquinazoline-7-sulfonic acid,
1-methyl-2,4-dioxo-1,2,3,4-tetrahydroquinazoline-8-sulfonic acid,
3-methyl-2,4-dioxo-1,2,3,4-tetrahydroquinazoline-5-sulfonic acid,
3-methyl-2,4-dioxo-1,2,3,4-tetrahydroquinazoline-6-sulfonic acid, 3-methyl-2,4-dioxo-1,2,3,4-tetrahydroquinazoline-7-sulfonic acid,
3-methyl-2,4-dioxo-1,2,3,4-tetrahydroquinazoline-8-sulfonic acid,
5-methyl-2,4-dioxo-1,2,3,4-tetrahydroquinazoline-6-sulfonic acid,
5-methyl-2,4-dioxo-1,2,3,4-tetrahydroquinazoline-7-sulfonic acid,
5-methyl-2,4-dioxo-1,2,3,4-tetrahydroquinazoline-8-sulfonic acid,
6-methyl-2,4-dioxo-1,2,3,4-tetrahydroquinazoline-5-sulfonic acid,
6-methyl-2,4-dioxo-1,2,3,4-tetrahydroquinazoline-7-sulfonic acid,
6-methyl-2,4-dioxo-1,2,3,4-tetrahydroquinazoline-8-sulfonic acid,
7-methyl-2,4-dioxo-1,2,3,4-tetrahydroquinazoline-5-sulfonic acid,
7-methyl-2,4-dioxo-1,2,3,4-tetrahydroquinazoline-6-sulfonic acid,
7-methyl-2,4-dioxo-1,2,3,4-tetrahydroquinazoline-8-sulfonic acid,
8-methyl-2,4-dioxo-1,2,3,4-tetrahydroquinazoline-5-sulfonic acid,
8-methyl-2,4-dioxo-1,2,3,4-tetrahydroquinazoline-6-sulfonic acid,
8-methyl-2,4-dioxo -1,2,3,4-tetrahydroquinazoline-7-sulfonic acid,
1,3-dimethyl-2,4-dioxo-1,2,3,4-tetrahydroquinazoline-5-sulfonic acid,
1,3-dimethyl-2,4-dioxo-1,2,3,4-tetrahydroquinazoline-6-sulfonic acid,
1,3-dimethyl-2,4-dioxo-1,2,3,4-tetrahydroquinazoline-7-sulfonic acid,
1,3-dimethyl-2,4-dioxo-1,2,3,4-tetrahydroquinazoline-8-sulfonic acid,
1,5-dimethyl-2,4-dioxo-1,2,3,4-tetrahydroquinazoline-6-sulfonic acid,
1,5-dimethyl-2,4-dioxo-1,2,3,4-tetrahydroquinazoline-7-sulfonic acid,
1,5-dimethyl-2,4-dioxo-1,2,3,4-tetrahydroquinazoline-8-sulfonic acid,
1,6-dimethyl-2,4-dioxo-1,2,3,4-tetrahydroquinazoline-5-sulfonic acid,
1,6-dimethyl-2,4-dioxo-1,2,3,4-tetrahydroquinazoline-7-sulfonic acid,
1,6-dimethyl-2,4-dioxo-1,2,3,4-tetrahydroquinazoline-8-sulfonic acid,
1,7-dimethyl-2,4-dioxo-1,2,3,4-tetrahydroquinazoline-5-sulfonic acid,
1,7-dimethyl-2,4-dioxo-1,2,3,4-tetrahydroquinazoline-6-sulfonic acid,
1,7-dimethyl-2,4-dioxo-1,2,3,4-tetrahydroquinazoline-8-sulfonic acid,
1,8-dimethyl-2,4-dioxo-1,2,3,4-tetrahydroquinazoline-5-sulfonic acid,
1,8-dimethyl-2,4-dioxo-1,2,3,4-tetrahydroquinazoline-6-sulfonic acid,
1,8-dimethyl-2,4-dioxo-1,2,3,4-tetrahydroquinazoline-7-sulfonic acid,
3,5-dimethyl-2,4-dioxo-1,2,3,4-tetrahydroquinazoline-6-sulfonic acid,
3,5-dimethyl-2,4-dioxo-1,2,3,4-tetrahydroquinazoline-7-sulfonic acid,
3,5-dimethyl-2,4-dioxo-1,2,3,4-tetrahydroquinazoline-8-sulfonic acid,
3,6-dimethyl-2,4-dioxo-1,2,3,4-tetrahydroquinazoline-5-sulfonic acid,
3,6-dimethyl-2,4-dioxo-1,2,3,4-tetrahydroquinazoline-7-sulfonic acid,
3,6-dimethyl-2,4-dioxo-1,2,3,4-tetrahydroquinazoline-8-sulfonic acid,
3,7-dimethyl-2,4-dioxo-1,2,3,4-tetrahydroquinazoline-5-sulfonic acid,
3,7-dimethyl-2,4-dioxo-1,2,3,4-tetrahydroquinazoline-6-sulfonic acid,
3,7-dimethyl-2,4-dioxo-1,2,3,4-tetrahydroquinazoline-8-sulfonic acid,
3,8-dimethyl-2,4-dioxo-1,2,3,4-tetrahydroquinazoline-5-sulfonic acid,
3,8-dimethyl-2,4-dioxo-1,2,3,4-tetrahydroquinazoline-6-sulfonic acid,
3,8-dimethyl-2,4-dioxo-1,2,3,4-tetrahydroquinazoline-7-sulfonic acid,
5,6-dimethyl-2,4-dioxo-1,2,3,4-tetrahydroquinazoline-7-sulfonic acid,
5,6-dimethyl-2,4-dioxo-1,2,3,4-tetrahydroquinazoline-8-sulfonic acid,
5,7-dimethyl-2,4-dioxo-1,2,3,4-tetrahydroquinazoline-6-sulfonic acid,
5,7-dimethyl-2,4-dioxo-1,2,3,4-tetrahydroquinazoline-8-sulfonic acid,
5,8-dimethyl-2,4-dioxo-1,2,3,4-tetrahydroquinazoline-6-sulfonic acid,
5,8-dimethyl-2,4-dioxo-1,2,3,4-tetrahydroquinazoline-7-sulfonic acid,
6,7-dimethyl-2,4-dioxo-1,2,3,4-tetrahydroquinazoline-5-sulfonic acid,
6,7-dimethyl-2,4-dioxo-1,2,3,4-tetrahydroquinazoline-8-sulfonic acid,
6,8-dimethyl-2,4-dioxo-1,2,3,4-tetrahydroquinazoline-5-sulfonic acid,
6,8-dimethyl-2,4-dioxo-1,2,3,4-tetrahydroquinazoline-7-sulfonic acid,
7,8-dimethyl-2,4-dioxo-1,2,3,4-tetrahydroquinazoline-5-sulfonic acid,
7,8-dimethyl-2,4-dioxo-1,2,3,4-tetrahydroquinazoline-6-sulfonic acid,
1-ethyl-2,4-dioxo-1,2,3,4-tetrahydroquinazoline-5-sulfonic acid,
1-ethyl-2,4-dioxo-1,2,3,4-tetrahydroquinazoline-6-sulfonic acid,
1-ethyl-2,4-dioxo-1,2,3,4-tetrahydroquinazoline-7-sulfonic acid,
1-ethyl-2,4-dioxo-1,2,3,4-tetrahydroquinazoline-8-sulfonic acid,
3-ethyl-2,4-dioxo-1,2,3,4-tetrahydroquinazoline-5-sulfonic acid,
3-ethyl-2,4-dioxo-1,2,3,4-tetrahydroquinazoline-6-sulfonic acid,
3-ethyl-2,4-dioxo-1,2,3,4-tetrahydroquinazoline-7-sulfonic acid,
3-ethyl-2,4-dioxo-1,2,3,4-tetrahydroquinazoline-8-sulfonic acid, 5-ethyl-2,4-dioxo-1,2,3,4-tetrahydroquinazoline-6-sulfonic acid,
5-ethyl-2,4-dioxo-1,2,3,4-tetrahydroquinazoline-7-sulfonic acid,
5-ethyl-2,4-dioxo-1,2,3,4-tetrahydroquinazoline-8-sulfonic acid,
6-ethyl-2,4-dioxo-1,2,3,4-tetrahydroquinazoline-5-sulfonic acid,
6-ethyl-2,4-dioxo-1,2,3,4-tetrahydroquinazoline-7-sulfonic acid,
6-ethyl-2,4-dioxo-1,2,3,4-tetrahydroquinazoline-8-sulfonic acid,
7-ethyl-2,4-dioxo-1,2,3,4-tetrahydroquinazoline-5-sulfonic acid,
7-ethyl-2,4-dioxo-1,2,3,4-tetrahydroquinazoline-6-sulfonic acid,
7-ethyl-2,4-dioxo-1,2,3,4-tetrahydroquinazoline-8-sulfonic acid,
8-ethyl-2,4-dioxo-1,2,3,4-tetrahydroquinazoline-5-sulfonic acid,
8-ethyl-2,4-dioxo-1,2,3,4-tetrahydroquinazoline-6-sulfonic acid,
8-ethyl-2,4-dioxo-1,2,3,4-tetrahydroquinazoline-7-sulfonic acid,
1-n-propyl-2,4-dioxo-1,2,3,4-tetrahydroquinazoline-5-sulfonic acid,
1-n-propyl-2,4-dioxo-1,2,3,4-tetrahydroquinazoline-6-sulfonic acid,
1-n-propyl-2,4-dioxo-1,2,3,4-tetrahydroquinazoline-7-sulfonic acid,
1-n-propyl-2,4-dioxo-1,2,3,4-tetrahydroquinazoline-8-sulfonic acid,
3-n-propyl-2,4-dioxo-1,2,3,4-tetrahydroquinazoline-5-sulfonic acid,
3-n-propyl-2,4-dioxo-1,2,3,4-tetrahydroquinazoline-6-sulfonic acid,
3-n-propyl-2,4-dioxo-1,2,3,4-tetrahydroquinazoline-7-sulfonic acid,
3-n-propyl-2,4-dioxo-1,2,3,4-tetrahydroquinazoline-8-sulfonic acid,
5-n-propyl-2,4-dioxo-1,2,3,4-tetrahydroquinazoline-6-sulfonic acid,
5-n-propyl-2,4-dioxo-1,2,3,4-tetrahydroquinazoline-7-sulfonic acid,
5-n-propyl-2,4-dioxo-1,2,3,4-tetrahydroquinazoline-8-sulfonic acid,
6-n-propyl-2,4-dioxo-1,2,3,4-tetrahydroquinazoline-5-sulfonic acid,
6-n-propyl-2,4-dioxo-1,2,3,4-tetrahydroquinazoline-7-sulfonic acid,
6-n-propyl-2,4-dioxo-1,2,3,4-tetrahydroquinazoline-8-sulfonic acid,
7-n-propyl-2,4-dioxo-1,2,3,4-tetrahydroquinazoline-5-sulfonic acid,
7-n-propyl-2,4-dioxo-1,2,3,4-tetrahydroquinazoline-6-sulfonic acid,
7-n-propyl-2,4-dioxo-1,2,3,4-tetrahydroquinazoline-8-sulfonic acid,
8-n-propyl-2,4-dioxo-1,2,3,4-tetrahydroquinazoline-5-sulfonic acid,
8-n-propyl-2,4-dioxo-1,2,3,4-tetrahydroquinazoline-6-sulfonic acid,
8-n-propyl-2,4-dioxo-1,2,3,4-tetrahydroquinazoline-7-sulfonic acid,
1-isopropyl-2,4-dioxo-1,2,3,4-tetrahydroquinazoline-5-sulfonic acid,
1-isopropyl-2,4-dioxo-1,2,3,4-tetrahydroquinazoline-6-sulfonic acid,
1-isopropyl-2,4-dioxo-1,2,3,4-tetrahydroquinazoline-7-sulfonic acid,
1-isopropyl-2,4-dioxo-1,2,3,4-tetrahydroquinazoline-8-sulfonic acid,
3-isopropyl-2,4-dioxo-1,2,3,4-tetrahydroquinazoline-5-sulfonic acid,
3-isopropyl-2,4-dioxo-1,2,3,4-tetrahydroquinazoline-6-sulfonic acid,
3-isopropyl-2,4-dioxo-1,2,3,4-tetrahydroquinazoline-7-sulfonic acid,
3-isopropyl-2,4-dioxo-1,2,3,4-tetrahydroquinazoline-8-sulfonic acid,
5-isopropyl-2,4-dioxo-1,2,3,4-tetrahydroquinazoline-6-sulfonic acid,
5-isopropyl-2,4-dioxo-1,2,3,4-tetrahydroquinazoline-7-sulfonic acid,
5-isopropyl-2,4-dioxo-1,2,3,4-tetrahydroquinazoline-8-sulfonic acid,
6-isopropyl-2,4-dioxo-1,2,3,4-tetrahydroquinazoline-5-sulfonic acid,
6-isopropyl-2,4-dioxo-1,2,3,4-tetrahydroquinazoline-7-sulfonic acid,
6-isopropyl-2,4-dioxo-1,2,3,4-tetrahydroquinazoline-8-sulfonic acid,
7-isopropyl-2,4-dioxo-1,2,3,4-tetrahydroquinazoline-5-sulfonic acid,
7-isopropyl-2,4-dioxo-1,2,3,4-tetrahydroquinazoline-6-sulfonic acid,
7-isopropyl-2,4-dioxo-1,2,3,4-tetrahydroquinazoline-8-sulfonic acid,
8-isopropyl-2,4-dioxo-1,2,3,4-tetrahydroquinazoline-5-sulfonic acid,
8-isopropyl-2,4-dioxo-1,2,3,4-tetrahydroquinazoline-6-sulfonic acid,
8-isopropyl-2,4-dioxo-1,2,3,4-tetrahydroquinazoline-7-sulfonic acid,
1-n-butyl-2,4-dioxo-1,2,3,4-tetrahydroquinazoline-5-sulfonic acid,
1-n-butyl-2,4-dioxo-1,2,3,4-tetrahydroquinazoline-6-sulfonic acid,
1-n-butyl-2,4-dioxo-1,2,3,4-tetrahydroquinazoline-7-sulfonic acid,
1-n-butyl-2,4-dioxo-1,2,3,4-tetrahydroquinazoline-8-sulfonic acid,
3-n-butyl-2,4-dioxo-1,2,3,4-tetrahydroquinazoline-5-sulfonic acid,
3-n-butyl-2,4-dioxo-1,2,3,4-tetrahydroquinazoline-6-sulfonic acid,
3-n-butyl-2,4-dioxo-1,2,3,4-tetrahydroquinazoline-7-sulfonic acid,
3-n-butyl-2,4-dioxo-1,2,3,4-tetrahydroquinazoline-8-sulfonic acid,
5-n-butyl-2,4-dioxo-1,2,3,4-tetrahydroquinazoline-6-sulfonic acid,
5-n-butyl-2,4-dioxo-1,2,3,4-tetrahydroquinazoline-7-sulfonic acid, 5-n-butyl-2,4-dioxo-1,2,3,4-tetrahydroquinazoline-8-sulfonic acid,
6-n-butyl-2,4-dioxo-1,2,3,4-tetrahydroquinazoline-5-sulfonic acid,
6-n-butyl-2,4-dioxo-1,2,3,4-tetrahydroquinazoline-7-sulfonic acid,
6-n-butyl-2,4-dioxo-1,2,3,4-tetrahydroquinazoline-8-sulfonic acid,
7-n-butyl-2,4-dioxo-1,2,3,4-tetrahydroquinazoline-5-sulfonic acid,
7-n-butyl-2,4-dioxo-1,2,3,4-tetrahydroquinazoline-6-sulfonic acid,
7-n-butyl-2,4-dioxo-1,2,3,4-tetrahydroquinazoline-8-sulfonic acid,
8-n-butyl-2,4-dioxo-1,2,3,4-tetrahydroquinazoline-5-sulfonic acid,
8-n-butyl-2,4-dioxo-1,2,3,4-tetrahydroquinazoline-6-sulfonic acid,
8-n-butyl-2,4-dioxo-1,2,3,4-tetrahydroquinazoline-7-sulfonic acid,
1-isobutyl-2,4-dioxo-1,2,3,4-tetrahydroquinazoline-5-sulfonic acid,
1-isobutyl-2,4-dioxo-1,2,3,4-tetrahydroquinazoline-6-sulfonic acid,
1-isobutyl-2,4-dioxo-1,2,3,4-tetrahydroquinazoline-7-sulfonic acid,
1-isobutyl-2,4-dioxo-1,2,3,4-tetrahydroquinazoline-8-sulfonic acid,
3-isobutyl-2,4-dioxo-1,2,3,4-tetrahydroquinazoline-5-sulfonic acid,
3-isobutyl-2,4-dioxo-1,2,3,4-tetrahydroquinazoline-6-sulfonic acid,
3-isobutyl-2,4-dioxo-1,2,3,4-tetrahydroquinazoline-7-sulfonic acid,
3-isobutyl-2,4-dioxo-1,2,3,4-tetrahydroquinazoline-8-sulfonic acid,
5-isobutyl-2,4-dioxo-1,2,3,4-tetrahydroquinazoline-6-sulfonic acid,
5-isobutyl-2,4-dioxo-1,2,3,4-tetrahydroquinazoline-7-sulfonic acid,
5-isobutyl-2,4-dioxo-1,2,3,4-tetrahydroquinazoline-8-sulfonic acid,
6-isobutyl-2,4-dioxo-1,2,3,4-tetrahydroquinazoline-5-sulfonic acid,
6-isobutyl-2,4-dioxo-1,2,3,4-tetrahydroquinazoline-7-sulfonic acid,
6-isobutyl-2,4-dioxo-1,2,3,4-tetrahydroquinazoline-8-sulfonic acid,
7-isobutyl-2,4-dioxo-1,2,3,4-tetrahydroquinazoline-5-sulfonic acid,
7-isobutyl-2,4-dioxo-1,2,3,4-tetrahydroquinazoline-6-sulfonic acid,
7-isobutyl-2,4-dioxo-1,2,3,4-tetrahydroquinazoline-8-sulfonic acid,
8-isobutyl-2,4-dioxo-1,2,3,4-tetrahydroquinazoline-5-sulfonic acid,
8-isobutyl-2,4-dioxo-1,2,3,4-tetrahydroquinazoline-6-sulfonic acid,
8-isobutyl-2,4-dioxo-1,2,3,4-tetrahydroquinazoline-7-sulfonic acid,
1-tert-butyl-2,4-dioxo-1,2,3,4-tetrahydroquinazoline-5-sulfonic acid,
1-tert-butyl-2,4-dioxo-1,2,3,4-tetrahydroquinazoline-6-sulfonic acid,
1-tert-butyl-2,4-dioxo-1,2,3,4-tetrahydroquinazoline-7-sulfonic acid,
1-tert-butyl-2,4-dioxo-1,2,3,4-tetrahydroquinazoline-8-sulfonic acid,
3-tert-butyl-2,4-dioxo-1,2,3,4-tetrahydroquinazoline-5-sulfonic acid,
3-tert-butyl-2,4-dioxo-1,2,3,4-tetrahydroquinazoline-6-sulfonic acid,
3-tert-butyl-2,4-dioxo-1,2,3,4-tetrahydroquinazoline-7-sulfonic acid,
3-tert-butyl-2,4-dioxo-1,2,3,4-tetrahydroquinazoline-8-sulfonic acid,
5-tert-butyl-2,4-dioxo-1,2,3,4-tetrahydroquinazoline-6-sulfonic acid,
5-tert-butyl-2,4-dioxo-1,2,3,4-tetrahydroquinazoline-7-sulfonic acid,
5-tert-butyl-2,4-dioxo-1,2,3,4-tetrahydroquinazoline-8-sulfonic acid,
6-tert-butyl-2,4-dioxo-1,2,3,4-tetrahydroquinazoline-5-sulfonic acid,
6-tert-butyl-2,4-dioxo-1,2,3,4-tetrahydroquinazoline-7-sulfonic acid,
6-tert-butyl-2,4-dioxo-1,2,3,4-tetrahydroquinazoline-8-sulfonic acid,
7-tert-butyl-2,4-dioxo-1,2,3,4-tetrahydroquinazoline-5-sulfonic acid,
7-tert-butyl-2,4-dioxo-1,2,3,4-tetrahydroquinazoline-6-sulfonic acid,
7-tert-butyl-2,4-dioxo-1,2,3,4-tetrahydroquinazoline-8-sulfonic acid,
8-tert-butyl-2,4-dioxo-1,2,3,4-tetrahydroquinazoline-5-sulfonic acid,
8-tert-butyl-2,4-dioxo-1,2,3,4-tetrahydroquinazoline-6-sulfonic acid,
8-tert-butyl-2,4-dioxo-1,2,3,4-tetrahydroquinazoline-7-sulfonic acid,
1-phenyl-2,4-dioxo-1,2,3,4-tetrahydroquinazoline-5-sulfonic acid,
1-phenyl-2,4-dioxo-1,2,3,4-tetrahydroquinazoline-6-sulfonic acid,
1-phenyl-2,4-dioxo-1,2,3,4-tetrahydroquinazoline-7-sulfonic acid,
1-phenyl-2,4-dioxo-1,2,3,4-tetrahydroquinazoline-8-sulfonic acid,
3-phenyl-2,4-dioxo-1,2,3,4-tetrahydroquinazoline-5-sulfonic acid,
3-phenyl-2,4-dioxo-1,2,3,4-tetrahydroquinazoline-6-sulfonic acid,
3-phenyl-2,4-dioxo-1,2,3,4-tetrahydroquinazoline-7-sulfonic acid,
3-phenyl-2,4-dioxo-1,2,3,4-tetrahydroquinazoline-8-sulfonic acid,
5-phenyl-2,4-dioxo-1,2,3,4-tetrahydroquinazoline-6-sulfonic acid,
5-phenyl-2,4-dioxo-1,2,3,4-tetrahydroquinazoline-7-sulfonic acid,
5-phenyl-2,4-dioxo-1,2,3,4-tetrahydroquinazoline-8-sulfonic acid,
6-phenyl-2,4-dioxo-1,2,3,4-tetrahydroquinazoline-5-sulfonic acid, 6-phenyl-2,4-dioxo-1,2,3,4-tetrahydroquinazoline-7-sulfonic acid,
6-phenyl-2,4-dioxo-1,2,3,4-tetrahydroquinazoline-8-sulfonic acid,
7-phenyl-2,4-dioxo-1,2,3,4-tetrahydroquinazoline-5-sulfonic acid,
7-phenyl-2,4-dioxo-1,2,3,4-tetrahydroquinazoline-6-sulfonic acid,
7-phenyl-2,4-dioxo-1,2,3,4-tetrahydroquinazoline-8-sulfonic acid,
8-phenyl-2,4-dioxo-1,2,3,4-tetrahydroquinazoline-5-sulfonic acid,
8-phenyl-2,4-dioxo-1,2,3,4-tetrahydroquinazoline-6-sulfonic acid,
8-phenyl-2,4-dioxo-1,2,3,4-tetrahydroquinazoline-7-sulfonic acid,
1,3-dioxo-1,2,3,4-tetrahydro-benzo[f]quinazoline-5-sulfonic acid,
1,3-dioxo-1,2,3,4-tetrahydro-benzo[f]quinazoline-6-sulfonic acid,
2,4-dioxo-1,2,3,4-tetrahydro-benzo[g]quinazoline-5-sulfonic acid,
2,4-dioxo-1,2,3,4-tetrahydro-benzo[g]quinazoline-10-sulfonic acid,
2,4-dioxo-1,2,3,4-tetrahydro-benzo[h]quinazoline-5-sulfonic acid and
2,4-dioxo-1,2,3,4-tetrahydro-benzo[h]quinazoline-6-sulfonic acid, as well as alkali metal salts, alkaline earth metal salts and transition metal salts belonging to groups 8 to 10 in the periodic table, preferably sodium, potassium and iron(III) salts, of the aromatic sulfonic acid derivatives.

Preferable examples include aromatic sulfonic acid derivatives such as 2,4-dioxo-1,2,3,4-tetrahydroquinazoline-5-sulfonic acid,
2,4-dioxo-1,2,3,4-tetrahydroquinazoline-6-sulfonic acid,
2,4-dioxo-1,2,3,4-tetrahydroquinazoline-7-sulfonic acid,
2,4-dioxo-1,2,3,4-tetrahydroquinazoline-8-sulfonic acid,
2,4-dioxo-1,2,3,4-tetrahydroquinazoline-5,7-disulfonic acid,
2,4-dioxo-1,2,3,4-tetrahydroquinazoline-6,8-disulfonic acid,
1-methyl-2,4-dioxo-1,2,3,4-tetrahydroquinazoline-5-sulfonic acid,
1-methyl-2,4-dioxo-1,2,3,4-tetrahydroquinazoline-6-sulfonic acid,
1-methyl-2,4-dioxo-1,2,3,4-tetrahydroquinazoline-7-sulfonic acid,
1-methyl-2,4-dioxo-1,2,3,4-tetrahydroquinazoline-8-sulfonic acid,
3-methyl-2,4-dioxo-1,2,3,4-tetrahydroquinazoline-5-sulfonic acid,
3-methyl-2,4-dioxo-1,2,3,4-tetrahydroquinazoline-6-sulfonic acid,
3-methyl-2,4-dioxo-1,2,3,4-tetrahydroquinazoline-7-sulfonic acid,
3-methyl-2,4-dioxo-1,2,3,4-tetrahydroquinazoline-8-sulfonic acid,
5-methyl-2,4-dioxo-1,2,3,4-tetrahydroquinazoline-6-sulfonic acid,
5-methyl-2,4-dioxo-1,2,3,4-tetrahydroquinazoline-7-sulfonic acid,
5-methyl-2,4-dioxo-1,2,3,4-tetrahydroquinazoline-8-sulfonic acid,
6-methyl-2,4-dioxo-1,2,3,4-tetrahydroquinazoline-5-sulfonic acid,
6-methyl-2,4-dioxo-1,2,3,4-tetrahydroquinazoline-7-sulfonic acid,
6-methyl-2,4-dioxo-1,2,3,4-tetrahydroquinazoline-8-sulfonic acid,
7-methyl-2,4-dioxo-1,2,3,4-tetrahydroquinazoline-5-sulfonic acid,
7-methyl-2,4-dioxo-1,2,3,4-tetrahydroquinazoline-6-sulfonic acid,
7-methyl-2,4-dioxo-1,2,3,4-tetrahydroquinazoline-8-sulfonic acid,
8-methyl-2,4-dioxo-1,2,3,4-tetrahydroquinazoline-5-sulfonic acid,
8-methyl-2,4-dioxo-1,2,3,4-tetrahydroquinazoline-6-sulfonic acid and
8-methyl-2,4-dioxo-1,2,3,4-tetrahydroquinazoline-7-sulfonic acid, as well as sodium, potassium and iron(III) salts, of the aromatic sulfonic acid derivatives.

More preferable examples include aromatic sulfonic acid derivatives such as 2,4-dioxo-1,2,3,4-tetrahydroquinazoline-5-sulfonic acid,
2,4-dioxo-1,2,3,4-tetrahydroquinazoline-6-sulfonic acid,
2,4-dioxo-1,2,3,4-tetrahydroquinazoline-7-sulfonic acid and
2,4-dioxo-1,2,3,4-tetrahydroquinazoline-8-sulfonic acid, as well as sodium, potassium and iron(III) salts, of the aromatic sulfonic acid derivatives.

Aromatic sulfonic acid derivatives represented by general formulas 1 or 2 can be used alone or in combination. They may be further used in combination with other dopants.

An aromatic sulfonic acid derivative represented by general formula 1 or 2 may be prepared by, for example, a compound represented by general formula 6 or 7 with an appropriate sulfonating agent such as sulfuric acid, fuming sulfuric acid, sulfur trioxide, sulfur trioxide-pyridine complex and amidosulfuric acid.

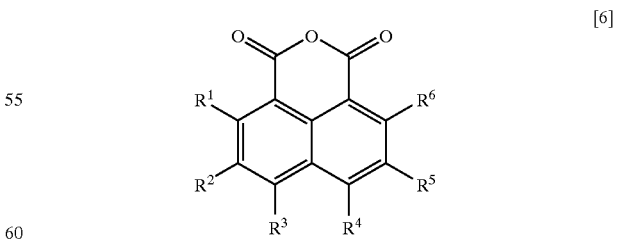

[6]

wherein at least one of $R^1$ to $R^6$ represents hydrogen and the others, which can be the same or different, represent hydrogen, alkyl having four or less carbon atoms or phenyl; or appropriate two or more of $R^1$ to $R^6$ may be combined together to form an aromatic or aliphatic ring.

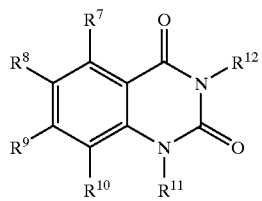

[7]

wherein at least one of $R^7$ to $R^{10}$ represents hydrogen and the remaining $R^7$ to $R^{12}$, which can be the same or different, represent hydrogen, alkyl having four or less carbon atoms or phenyl; or appropriate two or more of $R^7$ to $R^{10}$ may be combined together to form an aromatic or aliphatic ring.

As regards the synthesis via sulfonation described above, there is no particular limitation to the reaction conditions. For instance, the reaction ratio of the compound represented by general formula 6 or 7 as a starting material (hereinafter, referred to as a sulfonized material) to the sulfonating agent, is generally 1:1 to 200 (molar ratio). It is not necessary to use a reaction solvent in this sulfonation. If used, any solvent may be used insofar as it is capable of dissolving the sulfonized material and the sulfonating agent and, furthermore, does not get sulfonated itself. Examples of such solvents include dichloroethane, carbon tetrachloride and dioxane.

There is no particular limitation to the reaction temperature, insofar as it provides a proper reaction rate while avoiding abrupt heat generation causing progress of side reactions and avoiding decomposition of the sulfonized material and the reaction product aromatic sulfonic acid derivative. Generally, the reaction is carried out at a temperature of 0 to 150° C. Employing such reaction conditions, the desired product can be prepared at a high yield.

An aromatic sulfonic acid derivative according to this invention may be utilized as a dopant for doping a π-electron conjugated polymer to provide a conductive polymer material which exhibits electric conductivity over an extended period of time. The conductive polymer may be any polymer having a π-electron conjugated molecular structure; for example, conjugated polymers having at least one of a pyrrole, a thiophene and a aniline structure represented by general formula 3, 4 and 5, respectively, as a repeating unit.

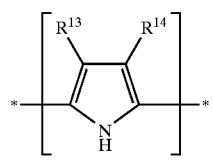

[3]

wherein $R^{13}$ and $R^{14}$, which may be the same or different, represent hydrogen or straight, cyclic or branched alkyl or alkoxy having 1 to 20 carbon atoms; or they may be combined together to form a ring; provided that the symbol "*" denotes the position where the repeating unit is bonded.

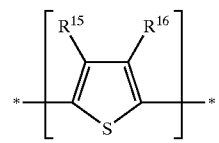

[4]

wherein $R^{15}$ and $R^{16}$, which may be the same or different, represents hydrogen or straight, cyclic or branched alkyl or alkoxy having 1 to 20 carbon atoms; or they may be combined together to form a ring; provided that the symbol "*" denotes the position where the repeating unit is bonded.

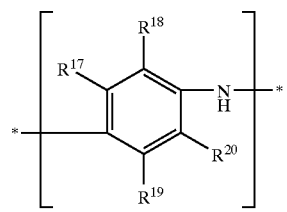

[5]

wherein $R^{17}$ to $R^{20}$, which may be the same or different, represents hydrogen or straight, cyclic or branched alkyl or alkoxy having 1 to 20 carbon atoms; or either $R^{17}$ and $R^{18}$ or $R^{19}$ and $R^{20}$ may be combined together to form a ring; provided that the symbol "*" denotes the position where the repeating unit is bonded.

Among these, a polymer used is preferably a π-electron conjugated polymer having at least one of the repeating units represented by general formulas 3, 4 and 5, particularly a polypyrrole π-electron conjugated polymer having the repeating unit represented by general formula 3.

A π-electron conjugated polymer may be doped with a aromatic sulfonic acid derivative according to this invention by any conventionally common process such as immersing the polymer in a solution of the aromatic sulfonic acid derivative, electrolytic oxidation polymerization using the aromatic sulfonic acid derivative as a supporting electrolyte, and chemical oxidation polymerization using a transition metal of the aromatic sulfonic acid derivative.

In the case of the immersion doping, a solvent used for dissolving the aromatic sulfonic acid derivative may, be any solvent with adequate dissolving power; for example, water, acetonitrile, nitrobenzene and propylene carbonate.

In the case of the electrolytic oxidation polymerization, doping can be accomplished by applying a given current or potential to a solution of an aromatic sulfonic acid derivative as a supporting electrolyte and a repeating-unit forming monomer. Examples of the repeating-unit forming monomer include pyrrole, thiophene, aniline and derivatives thereof.

The solvent used for the polymerization reaction may be any solvent which can dissolve the aromatic sulfonic acid derivative and a repeating-unit forming monomer; for example, water, dimethylformamide, acetonitrile, propylene carbonate and ethyleneglycol. The electrolytic oxidation polymerization can be carried out within a temperature range of −100 to 150° C., preferably 0 to 50° C., employing either constant-current or potentiostatic electrolysis. The electrolytic oxidation polymerization is preferably carried out in an inert gas atmosphere such as nitrogen and argon.

As for the doping via the chemical oxidation polymerization, a salt of the aromatic sulfonic acid derivative with a transition metal complex having a conjugate base ligand is contacted with a monomer having a repeating unit which can form a polymer having a π-electron conjugated molecular structure in a solvent to simultaneously conduct doping and polymerization. A central metal in the transition metal complex may be, for example, iron, cobalt or ruthenium, particularly iron. The transition metal complex is generally used in an amount of 1–10 mol to 1 mol of the monomer.

The repeating-unit forming monomer may be selected from pyrrole, thiophene, aniline and derivatives thereof described above. The solvent used in the reaction may be any solvent capable of dissolving the above transition metal complex and the monomer; for example, water, dimethyl formamide, acetonitrile, tetrahydrofuran, propylene carbonate and ethyleneglycol. A polymerization temperature is preferably 0 to 50° C. and a reaction period is preferably 1 to 48 hours. The polymerization is desirably conducted in an atmosphere of an inert gas such as nitrogen and argon.

There will be described an application of a conductive polymer material according to this invention to a cathode conductive material for a solid electrolytic capacitor.

A solid electrolytic capacitor generally has a basic structure where an anode metal is connected to a cathode conductive material via a dielectric layer, and each of the anode metal and the cathode conductive material has an electrode lead thereof.

The anode metal may be made of, for example, aluminum or tantalum, generally in the form of an optionally etched foil. A cathode conductive material is generally an inorganic or organic conductive material which has been processed into a film. On its surface, a metal cathode may be formed. Furthermore, a graphite layer may be formed between the cathode conductive material and the metal cathode for improving contact of the cathode conductive material with the metal cathode. The dielectric layer is generally a layer of an oxide of the anode metal, and may be thus formed by oxidizing the surface of the anode metal, or alternatively by applying a fluid containing the anode-metal oxide.

The solid electrolytic capacitor according to this invention comprises the conductive polymer material described above as a cathode conductive material, while the anode metal may be a commonly used material. The solid electrolytic capacitor comprising a cathode and an anode may have any shape such as a cylinder and a dipping piece.

EXAMPLES

This invention will be more specifically described with reference to, but not limited to, Examples.

Reference Example 1

Preparation of 3-sulfo-1,8-naphthalic anhydride

In 500 mL four-necked flask was placed 200 mL of fuming sulfonic acid (30 wt % excess of sulfur trioxide). With stirring the fuming sulfonic acid, 100 g of 1,8-naphthalic anhydride was slowly added, and then stirring was continued at 100° C. for 10 hours. Then, the reaction mixture was left overnight. The reaction mixture was poured into 200 g of ice to decompose unreacted fuming sulfonic acid. After standing, the mixture precipitated a brown powder, which was then collected by filtration with a glass filter. The brown solid obtained by filtration was added to 300 mL of acetone, and the mixture was stirred for washing. After washing, acetone was removed to give a solid, which was then dissolved in 150 mL of concentrated sulfuric acid. To the solution was added 75 g of ice to generate a precipitate, which was then filtered with a glass filter, rinsed with 300 mL of acetone, and dried in vacuo at room temperature for 24 hours to give a solid (37.1 g).

An FD-MS spectrum (Nippon Denshi Co. Ltd., SX-102A) for the product confirmed that the product was 3-sulfo-1,8-naphthalic anhydride(m/z=277). It was also confirmed by an NMR spectrum (Solvent: DMSO-$d_6$: 8.75 ppm (s, 1H), 8.65 ppm (s+d, 2H), 8.52 ppm (d, 1H) and 7.92 ppm (t, 1H)).

Reference Example 2

Preparation of (1H,3H)-quinazolinedione monosulfonic acid

A process was conducted as described in Reference Example 1, substituting 2,4(1H,3H)-quinazolinedione for 1,8-naphthalic anhydride to give 128.5 g of 2,4(1H,3H)-quinazolinedione monosulfonic acid.

An FD-MS spectrum confirmed that the product was 2,4(1H,3H)-quinazolinedione monosulfonic acid (m/z= 241). It was also confirmed by an NMR spectrum (Solvent: DMSO-$d_6$: 8.11 ppm (s, 1H), 7.83 ppm (d, 1H) and 7.12 ppm (d, 1H)).

Reference Example 3

Preparation of sodium salt of 2,4(1H,3H)-quinazolinedione monosulfonic acid

In 300 mL of pure water was dissolved 156.11 g of 2,4(1H,3H)-quinazolinedione monosulfonic acid prepared in Reference Example 2. To the stirred mixture was added portionwise 41.13 g of sodium carbonate. A white solid was precipitated. The precipitate was filtered and dried in vacuo at room temperature overnight to give 97.34 g of sodium salt of 2,4(1H,3H)-quinazolinedione monosulfonic acid.

Reference Example 4

Preparation of sodium salt of 3-sulfo-1,8-naphthalic anhydride

In 300 mL of pure water was dissolved 138.5 g of 3-sulfo-1,8-naphthalic anhydride prepared in Reference Example 1. To the stirred mixture was added portionwise 26.5 g of sodium carbonate. A white solid was precipitated. The precipitate was filtered and dried in vacuo at room temperature overnight to give 119.6 g of sodium salt of 3-sulfo-1,8-naphthalic anhydride.

Example 1

To 200 mL of pure water was dissolved 5.56 g of 3-sulfo-1,8-naphthalic anhydride prepared in Reference Example 1 and 1.34 g of pyrrole, to prepare a reaction solution for electrolytic oxidation polymerization.

To the reaction solution was bubbled nitrogen gas for about 15 min to replace the atmosphere with nitrogen. In the solution was then immersed two 4 cm square stainless 304 plates (separated by 1 cm) as a working electrode and a counter electrode. A constant current (1.25 mA/cm$^2$) was applied for 40 min to conduct electrolytic oxidation polymerization.

The polypyrrole film PA formed on the electrode was rinsed with pure water and acetone, removed from the electrode and dried in vacuo for 12 hours.

The conductivity of the obtained film PA was measured by a four probe method to be 61 S/cm.

Then, after retaining the polypyrrole film PA at an elevated temperature of 150° C. for 8 hours, its conductivity was re-measured to be 59 S/cm.

On the other hand, the polypyrrole film PA was immersed in pure water at 90° C. for 13 hours. The polypyrrole film was picked up, dried in vacuo and its conductivity was measured. This film kept a good conductivity of 53 S/cm.

Example 2

A polypyrrole film PB was prepared as described in Example 1, substituting 4.86 g of 2,4(1H,3H)-quinazolinedione monosulfonic acid prepared in Reference Example 2 for 3-sulfo-1,8-naphthalic anhydride.

Its conductivity of the film PB prepared was measured by a four probe method to be 91 S/cm.

After being retained in the air at an elevated temperature of 150° C. for 8 hours, the conductivity of the polypyrrole film PB was measured by a four probe method to be 89 S/cm.

After being retained in pure water at 90° C. for 13 hours and then dried in vacuo, the polypyrrole film PB kept a conductivity of 90 S/cm.

Example 3

A polypyrrole film PC was prepared as described in Example 2, substituting 5.28 g of sodium salt of 2,4(1H, 3H)-quinazolinedione monosulfonic acid prepared in Reference Example 3 for 2,4(1H,3H)-quinazolinedione monosulfonic acid.

The conductivity of the film PC prepared was measured by a four probe method to be 86 S/cm.

After being retained in the air at an elevated temperature of 150° C. for 7 hours, the conductivity of the polypyrrole film PC was measured by a four probe method to be 85 S/cm.

After being retained in pure water at 90° C. for 7 hours and then dried in vacuo, the film PC kept a conductivity of 90 S/cm.

Example 4

A polypyrrole film PD was prepared as described in Example 1, substituting 5.98 g of sodium salt of 3-sulfo-1,8-naphthalic anhydride prepared in Reference Example 4 for 3-sulfo-1,8-naphthalic anhydride.

After being retained in pure water at 90° C. for 7 hours and then dried, the film PD kept a good conductivity substantially as was immediately after its preparation.

Example 5

A poly-3,4-ethylenedioxythiophene film TA was prepared as described in Example 1, substituting 2.84 g of 3,4-ethylenedioxythiophene for pyrrole.

After being retained in pure water at 90° C. for 7 hours and then dried, the film TA kept a good conductivity substantially as was immediately after its preparation.

Example 6

A polyaniline film AA was prepared as described in Example 1, substituting 1.84 g of aniline for pyrrole.

After being retained in pure water at 90° C. for 7 hours and then dried, the film AA kept a good conductivity substantially as was immediately after its preparation.

Example 7

A poly-3,4-ethylenedioxythiophene film TB was prepared as described in Example 2, substituting 2.84 g of 3,4-ethylenedioxythiophene for pyrrole.

After being retained in pure water at 90° C. for 7 hours and then dried, the film TB kept a good conductivity substantially as was immediately after its preparation.

Example 8

A polyaniline film AB was prepared as described in Example 2, substituting 1.84 g of aniline for pyrrole.

After being retained in pure water at 90° C. for 7 hours and then dried, the film AB kept a good conductivity substantially as was immediately after its preparation.

INDUSTRIAL APPLICABILITY

An aromatic sulfonic acid derivative according to this invention can be used as a dopant for a conductive polymer. A conductive polymer material prepared after doping exhibits a higher conductivity, improved heat resistance and higher hot-water resistance. The conductive polymer material thus prepared can be, therefore, utilized as a material for, e. g., a capacitor electrode or battery electrode.

What is claimed is:

1. A conductive polymer material comprising a polymer having a π-electron conjugated molecular structure comprising a dopant comprising at least one of aromatic sulfonic acid derivatives represented by general formula 1:

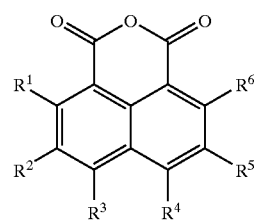

[1]

wherein at least one of $R^1$ to $R^6$ represents a sulfonic acid group having a counter cation selected from the group consisting of a hydrogen ion, an alkali metal ion, an alkaline-earth ion and a transition metal ion belonging to groups 8 to 10 in the periodic table; and the remaining $R^1$ to $R^6$, which may be the same or different, represent hydrogen, alkyl having four or less carbon atoms or phenyl; or any two or more of $R^1$ to $R^6$ may be combined together to form an aromatic or aliphatic ring; and general formula 2:

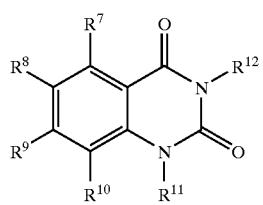

[2]

wherein at least one of $R^7$ to $R^{10}$ represents a sulfonic acid group having a counter cation selected from the group consisting of a hydrogen ion, an alkali metal ion, an alkaline-earth ion and a transition metal ion belonging to groups 8 to 10 in the periodic table; and the remaining $R^7$ to $R^{12}$, which may be the same or different, represent hydrogen, alkyl having four or less carbon atoms or phenyl; or any two or more of $R^7$ to $R^{10}$ may be combined together to form an aromatic or aliphatic ring.

2. The conductive polymer material as claimed in claim 1 wherein the polymer having a π-electron conjugated molecular structure comprises at least one repeating unit selected from the group consisting of general formula 3:

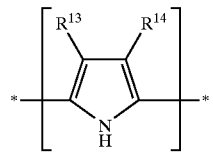

[3]

wherein $R^{13}$ and $R^{14}$, which may be the same or different, represent hydrogen or straight, cyclic or branched alkyl or alkoxy having 1 to 20 carbon atoms; or they may be combined together to form a ring; provided that the symbol "*" denotes the position where the repeating unit is bonded; general formula 4:

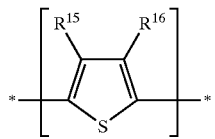

[4]

wherein $R^{15}$ and $R^{16}$, which may be the same or different, represents hydrogen or straight, cyclic or branched alkyl or alkoxy having 1 to 20 carbon atoms; or they may be combined together to form a ring; provided that the symbol "*" denotes the position where the repeating unit is bonded; and general formula 5:

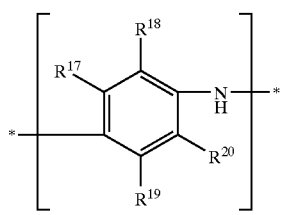

[5]

wherein $R^{17}$ to $R^{20}$, which may be the same or different, represents hydrogen or straight, cyclic or branched alkyl or alkoxy having 1 to 20 carbon atoms; or either $R^{17}$ and $R^{18}$ or $R^{19}$ and $R^{20}$ may be combined together to form a ring; provided that the symbol "*" denotes the position where the repeating unit is bonded.

3. A solid electrolytic capacitor comprising the conductive polymer material as claimed in claim 1 as a cathode conductive material.

4. A solid electrolytic capacitor comprising the conductive polymer as claimed in claim 2 as a cathode conductive material.

* * * * *